(12) United States Patent
Fakes et al.

(10) Patent No.: US 9,960,657 B2
(45) Date of Patent: May 1, 2018

(54) ROTARY ELECTRICAL MACHINE FOR MOTOR VEHICLE

(71) Applicant: VALEO EQUIPEMENTS ELECTRIQUES MOTEUR, Créteil (FR)

(72) Inventors: Michel Fakes, Seclin (FR); Jeremie Lutun, Paris (FR); Dominique Caubert, Montgeron (FR)

(73) Assignee: Valeo Equipements Electriques Moteur, Creteil (FR)

( * ) Notice: Subject to any disclaimer, the term of this patent is extended or adjusted under 35 U.S.C. 154(b) by 475 days.

(21) Appl. No.: 14/413,485

(22) PCT Filed: Jun. 21, 2013

(86) PCT No.: PCT/FR2013/051458
§ 371 (c)(1),
(2) Date: Jan. 8, 2015

(87) PCT Pub. No.: WO2014/009623
PCT Pub. Date: Jan. 16, 2014

(65) Prior Publication Data
US 2015/0194861 A1    Jul. 9, 2015

(30) Foreign Application Priority Data

Jul. 11, 2012   (FR) ...................................... 12 56656

(51) Int. Cl.
*H02K 9/06* (2006.01)
*H02K 5/20* (2006.01)
*H02K 1/24* (2006.01)

(52) U.S. Cl.
CPC ................. *H02K 9/06* (2013.01); *H02K 5/20* (2013.01); *H02K 1/243* (2013.01); *H02K 2213/03* (2013.01)

(58) Field of Classification Search
CPC ........ H02K 2213/03; H02K 3/04; H02K 3/28; H02K 3/50; H02K 5/18; H02K 5/20;
(Continued)

(56) References Cited

U.S. PATENT DOCUMENTS 5,021,696 A * 6/1991 Nelson .................. F04D 25/082
310/263
5,955,804 A * 9/1999 Kusase .................... H02K 3/12
29/596

(Continued)

FOREIGN PATENT DOCUMENTS

DE    102005045491    4/2007
EP    0539339          4/1993
(Continued)

OTHER PUBLICATIONS

EP 1906511 Description, English translation.*

*Primary Examiner* — John K Kim
*Assistant Examiner* — Noli Manaloto
(74) *Attorney, Agent, or Firm* — Berenato & White, LLC

(57) ABSTRACT

A rotating electrical machine, in particular to an alternator (A) or to an alternator-starter, for a motor vehicle, comprising: a rotor (2) supporting a front fan (23) at the front and a rear fan (24) at the rear, the rotor being rotatable about an axis of rotation, a stator (4) comprising a stator body and at least one winding placed on the stator body, the winding forming front and rear chignons on either side of the stator body, and a casing (1) in which the stator and the rotor are placed.

15 Claims, 3 Drawing Sheets

(58) Field of Classification Search
CPC .. H02K 9/04; H02K 9/06; H02K 3/24; H02K 3/12; H02K 1/243
USPC ........ 310/59, 195–208, 58, 62, 63, 89, 60 R
See application file for complete search history.

(56) References Cited

U.S. PATENT DOCUMENTS

| | | | | |
|---|---|---|---|---|
| 5,965,965 | A * | 10/1999 | Umeda | H02K 3/12 310/179 |
| 6,570,293 | B1 * | 5/2003 | Stroud | H02K 1/243 310/184 |
| 2001/0026102 | A1 * | 10/2001 | Asao | H02K 9/06 310/59 |
| 2002/0057971 | A1 * | 5/2002 | Shida | H02K 1/148 417/410.1 |
| 2007/0273243 | A1 | 11/2007 | Okumoto et al. | |
| 2010/0320878 | A1 * | 12/2010 | Izumi | H02K 5/20 310/60 R |

FOREIGN PATENT DOCUMENTS

| | | | | |
|---|---|---|---|---|
| EP | 0671801 | 9/1995 | | |
| EP | 0671802 | 9/1995 | | |
| EP | 0917278 | 5/1999 | | |
| EP | 0989657 | 3/2000 | | |
| EP | 0998011 | 5/2000 | | |
| EP | 1093209 | 4/2001 | | |
| EP | 1120883 | 8/2001 | | |
| EP | 1906511 A2 * | 4/2008 | ............... | H02K 5/24 |
| EP | 2061139 | 5/2009 | | |
| FR | 2908942 | 5/2008 | | |
| WO | WO2008000992 | 1/2008 | | |

\* cited by examiner

ROTARY ELECTRICAL MACHINE FOR MOTOR VEHICLE

CROSS-REFERENCE TO RELATED APPLICATIONS AND CLAIM TO PRIORITY

This application is a national stage application of International Application No. PCT/FR2013/051458 filed Jun. 21, 2013, which claims priority to French Patent Application No. 1256656 filed Jul. 11, 2012, of which the disclosures are incorporated herein by reference and to which priority is claimed.

FIELD OF THE INVENTION

The invention relates in particular to a rotary electrical machine, in particular an alternator or alternator-starter for a motor vehicle.

BACKGROUND OF THE INVENTION

Patent application FR 2 856 532 describes an alternator for a motor vehicle which comprises a rotor provided with permanent magnets and excitation windings. This alternator is provided with fans in order to cool it.

Patent application FR 2 785 464, for its part, describes an alternator provided with a stator winding which forms chignons on both sides of the stator casing. There is a difference in the axial spans of the chignons, so as to reduce the operating noise of aeraulic origin.

Patent applications EP 762 607 and EP 671 802 describe other alternators.

Patent application EP 2 157 679 describes a synchronous machine.

A need exists to have a rotary electrical machine, in particular an alternator, which has the following advantages:
- increased performance, i.e. a high output current, with machine dimensions which continue to be satisfactory;
- the absence of, or decrease in, the number of permanent magnets, in particular made of rare earth, on the rotor, which magnets can be extremely expensive.

SUMMARY OF THE INVENTION

The objective of the invention is in particular to make it possible to achieve these advantages.

With this aim, it is possible to increase the Ampere-turns of the rotor (N*iex=number of turns*excitation current iex). For this purpose, for the same given rotor dimensions, it is possible to reduce the number of turns (N) and increase the diameter of the wires, thus giving rise to a decrease in the electrical resistance R of the wires (R=ro*L/S, where ro is the resistivity of a wire, L is the length of a wire, and S is its cross-section), and therefore to an increase of the current iex.

If iex increases, the losses by joule effect Pj increase (Pj=resistance of copper*iex$^2$). The machine then needs to be adapted in order to withstand the additional heat.

For example, in order to make the winding able to withstand this additional heat, it would be possible to change the thermal class of the enamelled wires of the winding, and/or the insulating material between the wires and the magnet wheels. This would involve a relatively high cost, since the higher the thermal class of the enamelled wire, the more the costs increase.

The thermal class of a material provides the temperature resistance of a material for a certain number of hours of use, defined according to a standard.

Operating beyond the limits would give rise to risks of short-circuiting and unreliability, and this is not permissible.

The invention proposes a new rotary electrical machine with high-performance and reasonable cost prices.

The subject of the invention is thus a rotary electrical machine, in particular an alternator or alternator-starter for a motor vehicle, comprising:
- a rotor which bears a front fan at the front and rear fan at the rear, this rotor being rotary around an axis of rotation;
- a stator comprising a stator body, and at least one winding placed on the stator body, which winding forms front and rear chignons on both sides of the stator body, the height of the front chignon, measured according to the axis of rotation, being different from, for example higher than, that of the rear chignon;
- a housing (1) in which the stator and the rotor are placed, characterised in that:
- this housing comprises substantially lateral front openings and substantially lateral rear openings, at least partially opposite respective front and rear chignons, the total surface area of these front openings being different from, and in particular smaller than, the total surface area of the rear openings, and/or
- the housing comprises a boss, which in particular is integral with the remainder of the housing, or is formed by a brace secured on the remainder of the housing, which boss extends in the direction of the top of one of the chignons, in order to reduce the passage between this chignon and the housing, such as to generate a pressure difference between the front of the housing and the rear of the housing, which can generate a reinforced axial flow of air, which is substantially parallel to the axis of rotation, and circulates in the air gap between the rotor and the stator.

When the rotor comprises teeth and an electrical excitation winding, the reinforced flow of air advantageously circulates in the spaces between the teeth, thus sweeping the winding of the rotor.

By means of the invention, it is possible to obtain a rotary electrical machine with improved performance, which can supply high output currents, whilst ensuring that the temperature of the rotor remains within the limits tolerated, as a result of the reinforced axial flow of air obtained by means of the aforementioned asymmetries. In particular, for the production of the rotor, the invention makes it possible to avoid having to use materials resistant to high temperatures, which are costly.

The machine can be without additional fans, in particular fans distinct from the rotor, which are designed to produce an additional axial flow of air, since in this case the axial flow of air in the machine is generated substantially by the aforementioned asymmetries.

As a variant, the machine can be provided with additional fans, which in particular are distinct from the rotor, in order to produce an additional axial flow of air which supplements the axial flow of air generated by the aforementioned asymmetries.

The presence of a plurality of asymmetries makes it possible to create an axial flow of air with an intensity which is satisfactory for the cooling.

The difference between the height of the front chignon and that of the rear chignon is preferably at least 2.5 mm. In particular, this difference can be between 2.5 mm and 5 mm.

The front level of opening is for example smaller than 90% or 80% of the level of opening.

As a variant, the surface area of the rear openings can be smaller than 90% or 80% of that of the front openings.

In an example of implementation of the invention, the play, measured according to the axis of rotation, between the end of the front fan and the housing, is different from, and in particular larger than, the play between the end of the rear fan and the housing.

For example, the difference between the play, measured according to the axis of rotation, between the end of the front fan and the housing on the one hand, and the play between the end of the rear fan and the housing on the other hand, is more than 2 or 3 mm.

If applicable, the difference between the play measured according to the axis of rotation, between the top of the front chignon and the housing on the one hand, and the play between the top of the rear chignon and the housing on the other hand, is more than 2.5 mm.

Advantageously, the rotor is without permanent magnets, and in particular magnets inserted between claws or teeth of the rotor. Thus, the reinforced axial flow of air generated by the asymmetry is all the greater.

In one embodiment of the invention, the rotor is capable of producing approximately 1500 Ampere-turns.

If required, the rotor comprises a wire winding with a total cross-section of at least 200 mm².

In one embodiment of the invention, the rotor can comprise a single fan, either at the front or at the rear of the rotor.

In this case, the presence of a fan on a single side of the rotor generates asymmetry of pressure, which makes it possible to reinforce the axial flow of air.

The subject of the invention is also a rotary electrical machine, in particular an alternator or an alternator-starter for a motor vehicle, comprising:
  a rotor which bears a front fan at the front and rear fan at the rear, this rotor being rotary around an axis of rotation;
  a stator comprising a stator body, and at least one winding placed on the stator body, which winding forms front and rear chignons on both sides of the stator body;
  a housing in which the stator and the rotor are placed, and the play, measured according to the axis of rotation, between the end of the front fan and the housing is different from, and in particular larger than, the play between the end of the rear fan and the housing,
characterised in that:
  this housing comprises substantially lateral front openings and substantially lateral rear openings, at least partially opposite respective front and rear chignons, the total surface area of these front openings being different from, and in particular smaller than, the total surface area of the rear openings, and/or
  the housing comprises a boss, which in particular is integral with the remainder of the housing, or is formed by a brace secured on the remainder of the housing, which boss extends in the direction of the top of one of the chignons, in order to reduce the passage between this chignon and the housing,
such as to generate a pressure difference between the front of the housing and the rear of the housing, which can generate a reinforced axial flow of air, which is substantially parallel to the axis of rotation, and circulates in the air gap between the rotor and the stator.

The subject of the invention is also a rotary electrical machine, in particular an alternator or alternator-starter for a motor vehicle, comprising:
  a rotor which bears a single fan which is at the front or at the rear on the rotor, this rotor being rotary around an axis of rotation;
  a stator comprising a stator body, and at least one winding placed on the stator body, which winding forms front and rear chignons on both sides of the stator body;
  a housing in which the stator and the rotor are placed, characterised in that:
  this housing comprises substantially lateral front openings and substantially lateral rear openings, at least partially opposite respective front and rear chignons, the total surface area of these front openings being different from, and in particular smaller than, the total surface area of the rear openings, and/or
  the housing comprises a boss, which in particular is integral with the remainder of the housing, or is formed by a brace secured on the remainder of the housing, which boss extends in the direction of the top of one of the chignons, in order to reduce the passage between this chignon and the housing,
such as to generate a pressure difference between the front of the housing and the rear of the housing, which can generate a reinforced axial flow of air, which is substantially parallel to the axis of rotation, and circulates in the air gap between the rotor and the stator.

BRIEF DESCRIPTION OF THE DRAWINGS

The invention will be able to be better understood by reading the following detailed description of non-limiting embodiments of the invention, and by examining the appended drawing in which.

DETAILED DESCRIPTION

Figure 1:
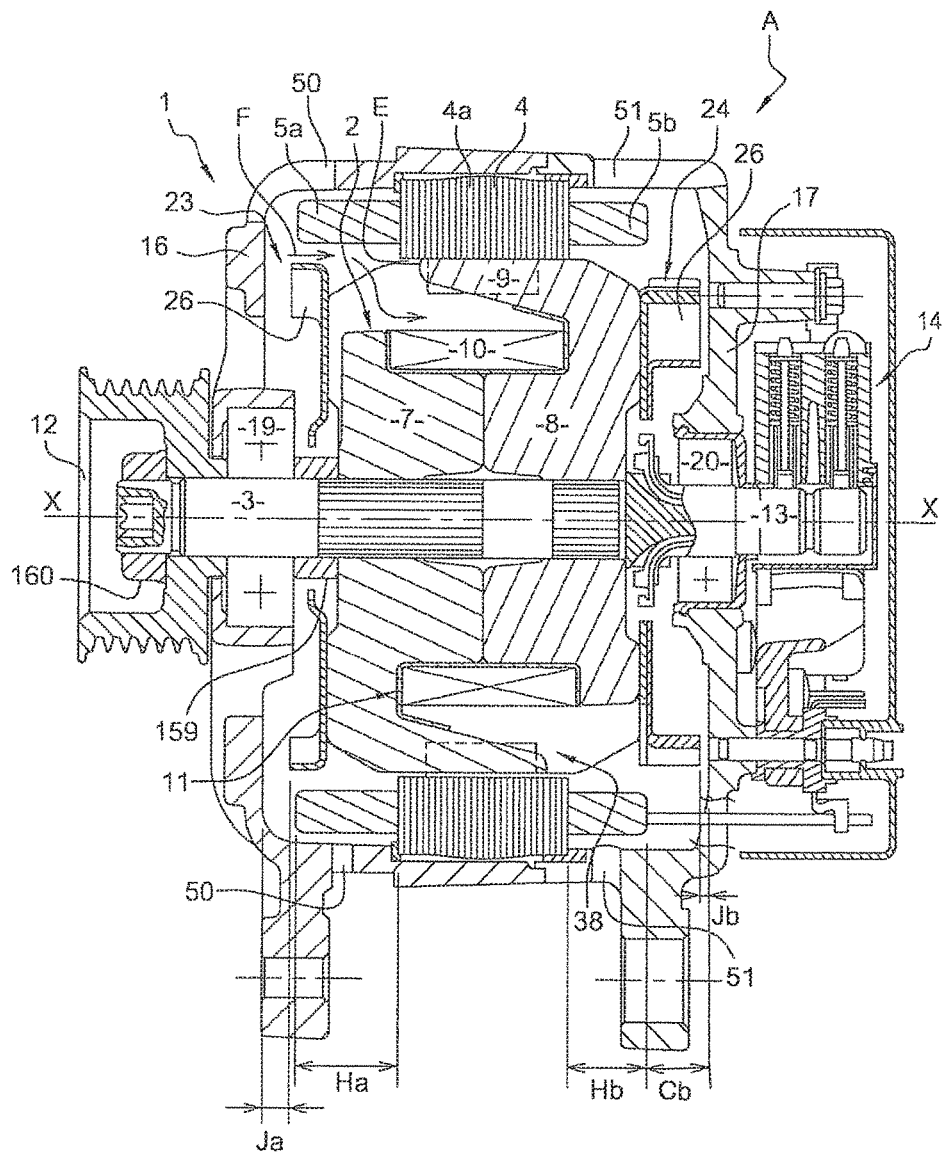
FIG. 1 represents schematically and partially, in cross-section, a rotary electrical machine according to an embodiment of the invention.

FIG. 1 represents a compact polyphase alternator A, in particular for a motor vehicle.

This alternator transforms mechanical energy into electrical energy, and can be reversible. A reversible alternator of this type is known as an alternator-starter, and makes it possible to transform electrical energy into mechanical energy, in particular in order to start the thermal engine of the vehicle.

This alternator A comprises a housing 1, and in its interior it comprises a rotor 2 with claws which is integral in rotation directly or indirectly with a shaft 3 and a stator 4, which surrounds the rotor 2 with the presence of an air gap.

The axis X-X of the shaft 3 forms the axis of rotation of the rotor 2.

Hereinafter in the description, the orientations radial, transverse and axial are to be considered relative to this axis X-X.

The stator 4 comprises a body 4a in the form of a set of plates provided with notches, for example of the semi-closed type, equipped with notch insulation, for mounting of the phases of the stator, each phase comprising at least one winding which passes through the notches in the body of the stator, and forms together with all the phases a front coil end, also known as a front chignon 5*a*, and a rear coil end, also known as a rear chignon 5*b*, on both sides of the body 4*a* of the stator 4.

The windings are obtained for example from a continuous wire covered with enamel, or from conductive elements in the form of a bar, such as pins which are connected to one another for example by welding.

These windings are for example three-phase windings which are connected in the form of a start or a triangle, the outputs of which are connected to at least one rectifier bridge comprising rectifier elements such as diodes or transistors of the MOSFET type, in particular when an alternator-starter such as described in document FR A 2 745 445 for example is involved.

The rotor 2 comprises two magnet wheels 7, 8. Each wheel 7, 8 has a flange with transverse orientation which is provided on its outer periphery with teeth 9, which for example have a trapezoidal form and axial orientation. The teeth 9 of a wheel face axially towards the flange of the other wheel, with the tooth of one magnet wheel penetrating into the space which exists between two adjacent teeth 9 of the other magnet wheel, such that the teeth 9 of the magnet wheels are imbricated.

The outer periphery of the teeth 9 has axial orientation, and defines together with the inner periphery of the body 4*a* of the stator the air gap E between the stator 4 and the rotor 2.

The inner periphery of the teeth 9 is inclined. These teeth 9 are thinner at their free end.

The flanges of the wheels 7, 8 have an annular form.

A cylindrical core is interposed axially between the flanges of the wheels 7, 8. In this case, this core consists of two half-cores which each belong to one of the flanges.

This core bears on its outer periphery an excitation winding 10 which is wound in an insulator 11 interposed radially between the core and this winding 10.

In the example described, this insulator 11 is made of electrically insulating and mouldable material such as plastic material, whereas the magnet wheels 7, 8 and the core are made of metal, in this case ferromagnetic material such as mild steel. The shaft 3 is also metal and is made of ferromagnetic material such as steel, which is harder than that of the magnet wheels and the core of the rotor with claws.

The housing 1 comprises front 16 and rear 17 bearings which are assembled together.

The rear bearing 17 bears the brush-holder, the voltage regulator, and at least one rectifier bridge.

The bearings 16 and 17 have a hollow form, and each bear centrally a ball bearing, respectively 19 and 20, for mounting with rotation of the shaft 3 of the rotor 2.

A pulley 12 is secured on the front end of the shaft 3, in this case by means of a nut 160 which is supported on the base of the cavity in this pulley 12. This pulley 12 comprises a bush which is in contact with the inner ring of the bearing 19. An annular brace 159 is interposed axially between the frontal surface of the front magnet wheel 7 and the inner ring of the bearing 19. The shaft 3 passes through the brace 159 and the bush of the pulley 12.

The front end of the shaft 3 bears the pulley 12 which belongs to a device for transmission of movements to at least one belt between the alternator and the thermal engine of the motor vehicle, whereas the rear end 13 with a reduced diameter of the shaft 3 bears collector rings which are connected by wired connections to the ends of the winding 10. Brushes which belong to a brush-holder 14 are disposed such as to rub on the collector rings. The brush-holder is connected to a voltage regulator.

When the excitation winding 10 is supplied electrically by the brushes, the rotor 2 is magnetised, and becomes an inductor rotor with formation of magnetic North-South poles at the level of the claws, and thus of the teeth of the magnet wheels.

This inductor rotor 10 creates an alternating induced current in the induced stator when the shaft 3 rotates, with the rectifier bridge(s) making it possible to transform the induced alternating current into direct current, in particular in order to supply the charges and the consumers of the on-board network of the motor vehicle, as well as to recharge the battery of the said vehicle.

This rotor comprises permanent magnets 38 which are interposed between two teeth 9 adjacent to the outer periphery of the rotor.

As a variant, the rotor can be without magnets of this type.

In the example described, the height Ha of the front chignon 5*a*, measured according to the axis of rotation X, is higher than that Hb of the rear chignon 5*b*.

The difference between the height Ha of the front chignon 5*a* and that Hb of the rear chignon 5*b* is at least 2.5 mm, and is for example 3 mm.

The front 16 and rear 17 bearings comprise substantially lateral front 50 and rear 51 openings for the passage of the air, in order to permit the cooling of the alternator by circulation of air generated by the rotation of a fan 23 on the front frontal surface of the rotor, and another fan 24 on the rear dorsal surface of the rotor, each fan being provided with a plurality of blades 26.

The front 50 and rear 51 lateral openings are opposite respectively front 5*a* and rear 5*b* chignons, the total surface area of the front openings 50 being smaller than the total surface area of the rear openings 51.

As a variant, in another embodiment of the invention, the surface area of the front openings 50 can be larger than that of the rear openings 51.

In the example described, the front opening surface area can be smaller than 90% of the rear opening level.

These asymmetries, i.e. the difference between Ha and Hb and the difference between the front and rear levels of opening, make it possible to generate a pressure difference between the front of the housing and the rear of the housing, which can generate a reinforced axial flow of air F which is substantially parallel to the axis of rotation, and circulates in the air gap E between the rotor and the stator, and between the inter-claw spaces of the magnet wheels, thus sweeping the winding of the rotor.

Figure 4:
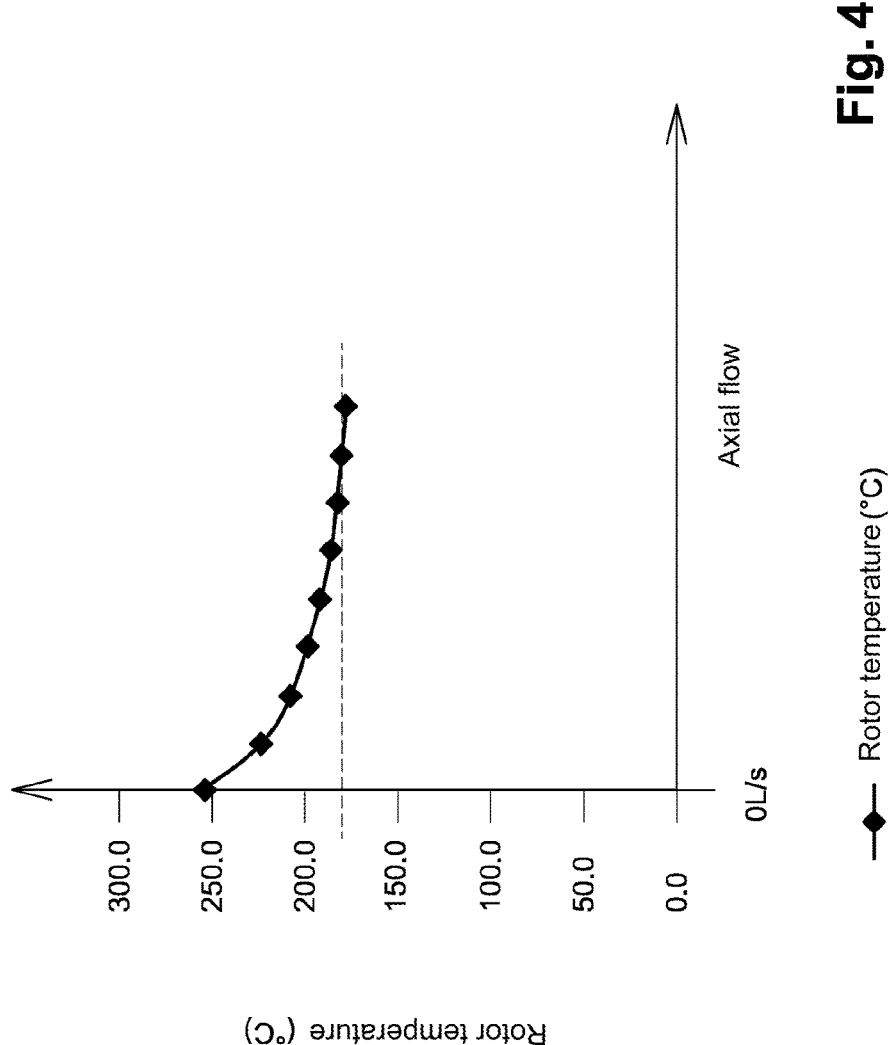
FIG. 4 shows schematically the development of the temperature according to the axial flow of air in a machine according to the invention.

The greater this axial flow of air, the lower the temperature of the rotor, as shown in FIG. 4.

In the example described, the alternator A develops electric power of 3 kW, and the axial flow of air is approximately 2 L/s.

In addition to the aforementioned asymmetries, it is possible for the play Ja measured according to the axis of rotation, between the end of the front fan 23 and the housing, to be larger than the play Jb between the end of the rear fan 24 and the housing.

The difference between the play Ja measured according to the axis of rotation, between the end of the front fan (i.e. its blades) and the housing on the one hand, and the play Jb between the end of the rear fan and the housing on the other hand, is for example approximately 2 mm or more.

In another embodiment of the invention (not represented), it is possible for the plays Ja and Jb to have identical values.

In another embodiment, the openings 50 and 51 can be without substantial asymmetry.

Figure 2:
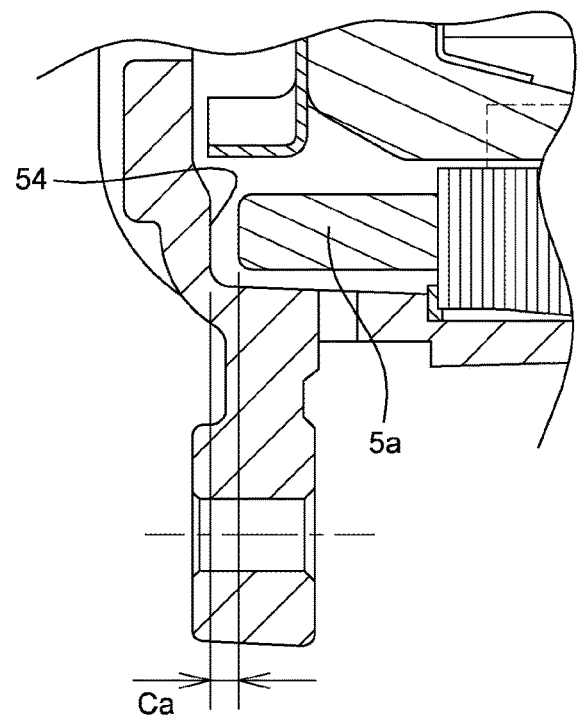
FIGS. 2 and 3 represent two other embodiments of the invention.

In this case, in addition to the asymmetry of the height of the chignons Ha and Hb, the housing can comprise a boss 54 which is integral with the remainder of the housing, as illustrated in FIG. 2.

Figure 3:
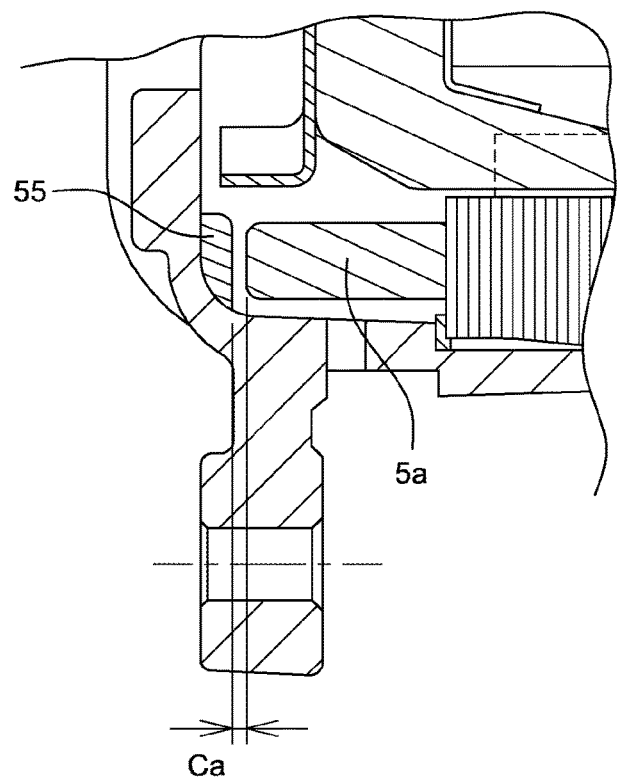

As a variant, as illustrated in FIG. 3, this boss can be formed by a brace 55 secured to the remainder of the housing, which boss extends in the direction of the top of one of the chignons, in order to reduce the passage between this chignon and the housing.

In these examples in FIGS. 2 and 3, there is a difference between the play Ca measured according to the axis of rotation, between the top of the front chignon 5a and the housing on the one hand, and the play Cb between the top of the rear chignon 5b and the housing on the other hand.

These bosses can be distributed around the axis X-X, for example at a constant angle relative to one another.

The difference between the play Ca, measured according to the axis of rotation, between the top of the front chignon 5a and the housing on the one hand, and the play Cb between the top of the rear chignon 5b and the housing on the other hand, is greater than 2.5 mm.

The rotor comprises a winding of wires with a total cross-section of at least 200 mm$^2$.

It will be appreciated that when other combinations of asymmetries are used, this does not depart from the context of the present invention.

For example, the rotor can be provided with a single fan at the front or the rear, this asymmetry preferably being associated with the asymmetry of the surface areas of the front and rear openings, or with the asymmetry of the play between the top of the chignons and the housing.

The invention claimed is:

1. A rotary electrical machine for a motor vehicle, comprising:
   a rotor bearing a front fan at a front and a rear fan at a rear, the rotor being rotatable around an axis of rotation;
   a stator comprising a stator body having axially opposite sides and at least one winding placed on the stator body, the at least one winding forming front and rear chignons on both sides of the stator body;
   a housing in which the stator and the rotor are placed, and a play is measured in the direction of the axis of rotation between an end of the front fan and the housing;
   the housing comprising substantially lateral front openings and substantially lateral rear openings at least partially opposite respective front and rear chignons, a total surface area of the front openings being different from the total surface area of the rear openings;
   the housing further comprising a boss integral with the remainder of the housing or formed by a brace secured on the remainder of the housing, the boss extends axially in the direction of a top of one of the chignons in order to reduce the passage between the one of the chignons and the housing so as to generate a pressure difference between the front of the housing and the rear of the housing, which can generate a reinforced axial flow of air, which is substantially parallel to the axis of rotation and circulates in an air gap between the rotor and the stator;
   a difference between a play (Ca) measured in the direction of the axis of rotation between the top of the front chignon and the housing, and a play (Cb) between the top of the rear chignon and the housing, is more than 2.5 mm.

2. The rotary electrical machine according to claim 1, wherein a difference between a height (Ha) of the front chignon and a height (Hb) of the rear chignon is not zero, and wherein the difference is at least 2.5 mm.

3. The rotary electrical machine according to claim 2, wherein the surface area of the front opening is smaller than 90% of the surface area of the rear opening.

4. The rotary electrical machine according to claim 2, wherein the surface area of the rear opening is smaller than 90% of the surface area of the front opening.

5. The rotary electrical machine according to claim 2, wherein the rotor is without permanent magnets inserted between claws of the rotor.

6. The rotary electrical machine according to claim 1, wherein the total surface area of the front opening is smaller than 90% of the total surface area of the rear opening.

7. The rotary electrical machine according to claim 6, wherein the rotor is without permanent magnets inserted between claws of the rotor.

8. The rotary electrical machine according to claim 1, wherein the total surface area of the rear opening is smaller than 90% of the total surface area of the front opening.

9. The rotary electrical machine according to claim 8, wherein the rotor is without permanent magnets inserted between claws of the rotor.

10. The rotary electrical machine according to claim 1, wherein the rotor is without permanent magnets inserted between claws of the rotor.

11. The rotary electrical machine according claim 1, wherein the rotor is capable of producing 1500 Ampere-turns.

12. The rotary electrical machine according to claim 1, wherein the rotor comprises a wire winding with a total cross-section of at least 200 mm$^2$.

13. A rotary electrical machine for a motor vehicle, comprising:
   a rotor bearing a front fan at a front and a rear fan at a rear, the rotor being rotatable around an axis of rotation;
   a stator comprising a stator body having axially opposite sides and at least one winding placed on the stator body, the at least one winding forming front and rear chignons on both sides of the stator body;
   a housing in which the stator and the rotor are placed, and a play is measured in the direction of the axis of rotation between an end of the front fan and the housing;
   the housing comprising substantially lateral front openings and substantially lateral rear openings at least partially opposite respective front and rear chignons, a total surface area of the front openings being different from the total surface area of the rear openings;
   the housing further comprising a boss integral with the remainder of the housing or formed by a brace secured on the remainder of the housing, the boss extends axially in the direction of a top of one of the chignons in order to reduce the passage between the one of the chignons and the housing so as to generate a pressure difference between the front of the housing and the rear of the housing, which can generate a reinforced axial flow of air, which is substantially parallel to the axis of rotation and circulates in an air gap between the rotor and the stator;
   the total surface area of the front opening is smaller than 90% of the total surface area of the rear opening;
   a difference between a play (Ja), measured in the direction of the axis of rotation between the end of the front fan and the housing, and a play (Jb) between the end of the rear fan and the housing, is more than 2 mm.

14. The rotary electrical machine according to claim 13, wherein a difference between a play (Ca) measured in the direction of the axis of rotation between the top of the front chignon and the housing, and a play (Cb) between the top of the rear chignon and the housing, is more than 2.5 mm.

15. The rotary electrical machine according to claim 13, wherein the rotor is without permanent magnets inserted between claws of the rotor.

* * * * *